May 12, 1970     D. C. CLINE ET AL     3,511,515
VEHICLE FUEL TANK WITH BREAKAWAY CONNECTIONS
Filed Sept. 14, 1967
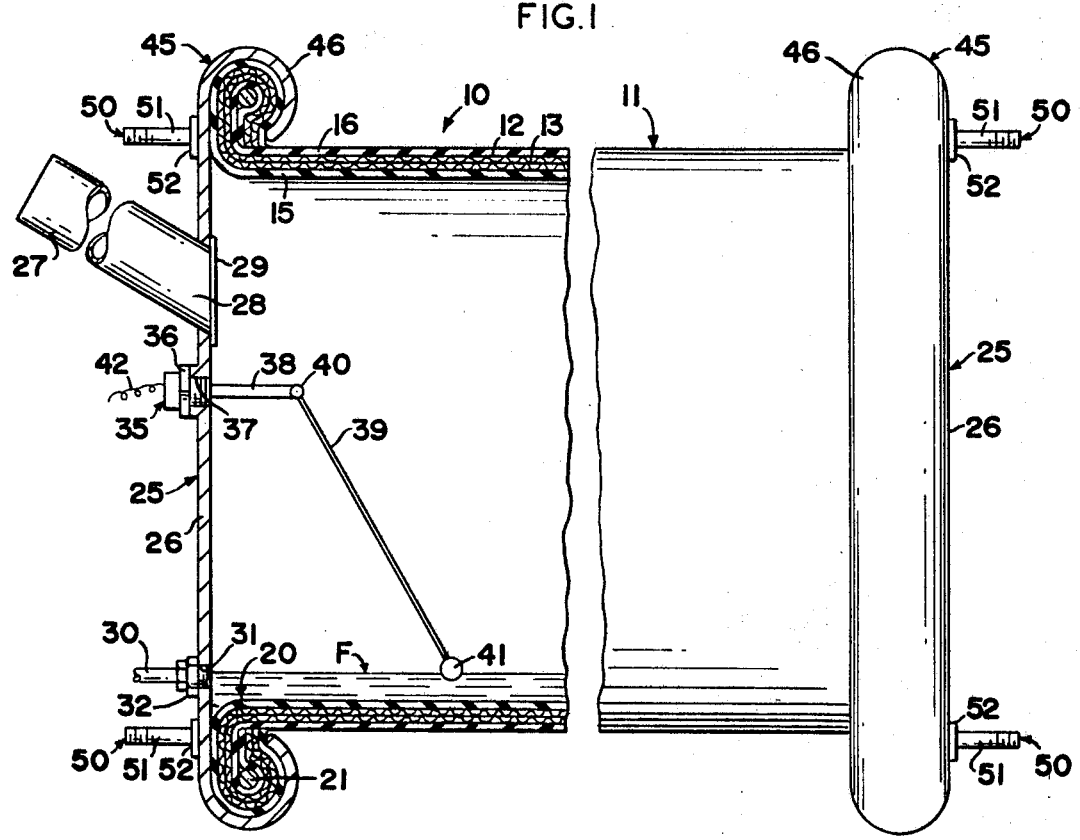
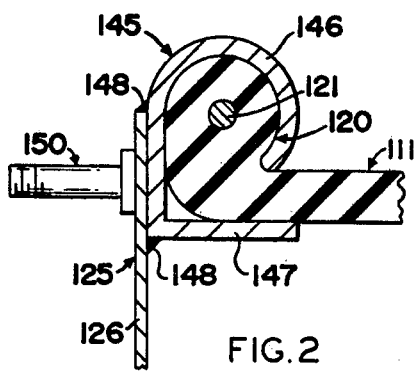
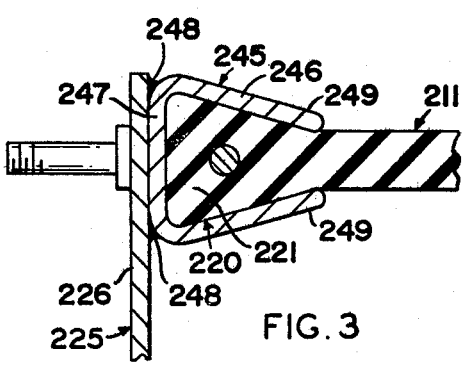

3,511,515
VEHICLE FUEL TANK WITH BREAKAWAY
CONNECTIONS
Delbert C. Cline and Lyman P. Parkinson, Akron, Ohio,
 assignors to The Firestone Tire & Rubber Company,
 Akron, Ohio, a corporation of Ohio
Filed Sept. 14, 1967, Ser. No. 667,743
Int. Cl. B60p 3/22
U.S. Cl. 280—5                                    15 Claims

ABSTRACT OF THE DISCLOSURE

A crash resistant fuel tank for vehicles having substantially rigid end members with an attached fuel gage fitting, a filler neck fitting, an outlet fitting, and suspension fittings to fasten the tank to a vehicle and to allow breakaway prior to rupture of the tank and having an elastomeric body portion spacing the end members and engaging them in fluid tight relation.

BACKGROUND OF THE INVENTION

Due to the increased use of extremely volatile fuels in automobile racing a few years ago, the incidence of disastrous fires caused by exploding or ruptured metal fuel tanks threatened the continued existence of many forms of auto racing. A conventional metal tank of practical wall thickness ruptures easily when contacted by other structural components during a crash. This crisis was overcome by the development of elastomeric racing car tanks which have proved to be substantially crash resistant in even the most testing circumstances. Thus, the danger of fire to drivers and spectators has been reduced to a status commensurate with other dangers inherent in the sport of auto racing.

A similar problem has existed in regard to conventional passenger automobiles and trucks which have long employed metal fuel tanks, thereby producing an appreciable annual death rate attributable to fuel fires in conjunction with collisions. The elastomeric racing car tanks have not been adapted to conventional automobiles primarily due to the excessive cost factor. Thus far, the elastomeric tanks have been hand fabricated, custom units made entirely of the elastomeric material and frequently designed for a particular car or a very limited production which is common in the racing business, thereby accounting for the fact that costs range upward of thirty times the price of mass produced conventional metal tanks. Therefore, it has not been economically feasible heretofore to provide conventional vehicles with the technically optimum design in crash resistant fuel tanks.

In the passenger car field, the only developments relating to overcoming the fire hazard caused by metallic fuel tanks have been concerned with attachment to the vehicle. Recently, a proposal has been made recommending a breakaway connection between the fuel filler line and the vehicle to prevent rupturing the end of the fuel tank when it is physically displaced as the result of a collision. However, such a construction does not in any way improve the ability of the tank itself to withstand impact forces and tearing action by associated structural members which are deflected or torn loose under collision conditions.

SUMMARY OF THE INVENTION

Accordingly, the present invention provides a fuel tank for automobiles having improved crash resistant characteristics; provides a fuel tank constructed of flexible material in the critical areas to withstand impact forces which would be destructive of conventional metallic tanks; provides a fuel tank which can be designed in a wide variety of geometric shapes to conform to available space in a particular automotive model; provides a structure which is compatible with existing fuel tank fittings and associated components with little or no revision thereto; provides a tank which can be fabricated on conventional equipment and quickly and easily assembled; and provides a construction, which when considering all aspects, including installation and maintenance, is substantially cost competitive with conventional metal fuel tanks.

DESCRIPTION OF THE DRAWINGS

FIG. 1 is a side elevation, with portions broken away and other portions in section, depicting a fuel tank device according to the present invention.

FIG. 2 is a partial section view showing a modified form of attachment between the substantially rigid end members and the elastomeric body portion of the device of FIG. 1.

FIG. 3 is a partial section view showing an additional modified attachment similar to FIG. 2.

DESCRIPTION OF A PREFERRED EMBODIMENT

Figure 4:
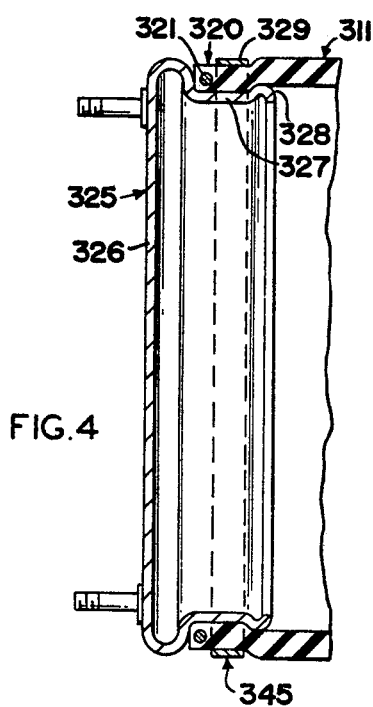
FIG. 4 is a partial section view of one end of the fuel tank of FIG. 1 showing a further modified attachment between the substantially rigid end members and the elastomeric body portion.

Referring generally to the drawings and particularly to FIG. 1 thereof, a crash resistant fuel tank, generally indicated by the numeral 10, is depicted as exemplary apparatus embodying the present invention. The fuel tank 10 has a body portion, generally indicated by the numeral 11, which is constructed of an elastomeric material. As shown, the body portion 11 is composed of four layers of material which combine to provide the requisite strength and environmental resistance characteristics. Two adjacent inner plies 12 and 13 constitute the primary strength, toughness, and resilience members. The inner plies 12, 13 may be constructed of any desired cord fabric, which can be woven or wrapped, such as cotton, rayon, nylon, Dacron, woven metal, glass, or other plastic material depending upon the strength, weight, and environmental compatibility factors involved in a particular design. Although the number of inner plies and their construction can be varied as necessary, two, three or four plies with a cord bias of approximately 45° to provide good resilience should be adequate for most vehicle fuel tanks, regardless of the type of vehicle and placement of the tank thereon.

In order to provide suitable environmental protection, the plies 12, 13 are preferably covered by an innerliner 15 and an outerliner 16. The innerliner 15 is preferably constructed of a material which is chemically inert in the presence of the type of fuel to be employed in the tank. With respect to most types of automotive fuels, materials such as polyurethane, N–BR, silicon, Viton, and neoprene give satisfactory performance. Depending upon placement in the vehicle, the outerliner 16 will normally need be resistant to weather, road tars, salt and similar substances encountered by vehicles. Materials such as polyurethane and neoprene are particularly effective in combating elements of this type over extended periods of time. The above suggested materials for innerliner 15 and outerliner 16 are exemplary only, and numerous other adaptable materials will be readily apparent to persons skilled in the art.

The configuration of the elastomeric body portion 11 may be such that a cross section is generally circular, oval, rectangular, or even irregularly shaped, as necessary to best conform to the portion of the vehicle where it is to be mounted. A substantially annular configuration is particularly advantageous for the reason that a conventional tire building drum and established procedures may be employed in fabricating such shapes. However, various types of weaving and wrapping machines may be advantageously employed for specialized cord configurations and geometric shapes.

At either end of the body portion 11, provision is made for connection to complementary holding devices more fully described hereinafter. A preferred attachment configuration, generally indicated by the numeral 20, consists of a metal wire bead 21 around which the ends or extremities of one or more of plies 12, 13, innerliner 15, and outerliner 16 are outwardly wrapped to form enlarged sections. Such a configuration is substantially identical to the fabrication of certain types of tire beads and produces a strong, durable attaching member when appropriately cured.

The attachment configurations 20 at either end of the body portion 11 are connected to substantially rigid end members, generally indicated by the numeral 25, to constitute a generally closed fuel tank structure. For ease of construction and economy the end members 25 may have a generally flat plate 26 of sheet metal material. If desired, the plates 26 may be made of stainless steel or an anodized metal to inhibit corrosion; moreover, various plastic or impregnated fiber materials could be employed with substantially identical results.

One of the end members 25 of fuel tank 10 is preferably provided with all of the operational appendancies necessary to the ingress, egress, and quantitive measurement of the fuel. A filler hose 27 having a neck 28 may be extended through the flat plate 26 and provided with an enlarged flange 29 at its extremity which maintains the filler hose connected to fuel tank 10 even under crash conditions. The filler hose 27 extends to a capped gas receptacle (not shown) mounted for access exteriorly of the vehicle to allow ingress of fuel by conventional pumps. In order to preclude severance of the filler hose 27 when the fuel tank 10 separates from the vehicle in a manner to be described hereinafter, the hose 27 is preferably attached for breakaway from the gas receptacle at a lesser stress than will cause parting.

Egress of fuel from the tank 10 is effected by a fuel line 30 which is preferably located at or near the bottom of the tank, regardless of the particular installation orientation. The fuel line 30 may extend through an aperture 31 in the flat plate 26 of end member 25 provided with a suitable coupling 32 for detachable securement. The fuel line 30 is normally sufficiently flexible to allow for displacement of the fuel tank 10 under crash conditions without danger of a rupture which would cause appreciable loss of fuel.

In accordance with normal convenience for determining the amount of fuel in the tank 10, a fuel gage device, generally indicated by the numeral 35, is installed in an end member 25. The fuel gage 35 has a fitting 36 extending through an aperture 37 in plate 26 and having a fixed projecting arm 38 supporting a movable arm 39 about a pivot pin 40. The movable arm 39 carries a floatation ball 41 which remains positioned at the surface of the fuel F contained in tank 10. The angle of movable arm 39 with respect to fixed arm 38 is converted to an electrical signal in a conventional manner and transmitted by lead wires 42 to a remote indicator (not shown) for display on the dashboard of the vehicle.

The periphery of each end member 25 has a securing device, generally indicated by the numeral 45, which engages the attachment configuration 20, so that the elastomeric body portion 11 serves to space and connect the end members 25 in fluid tight relation. As shown in FIG. 1, the securing device 45 constitutes the formation of an inturned loop 46 in end members 25 which snugly clamps or encases the wire bead 21 and surrounding plies of attachment configuration 20 through approximately three quadrants of its periphery. Thus, this attachment can be effected by the simple fabrication step of die crimping the periphery of end members 25 to achieve some of the major objectives of the present invention. It should be noted this embodiment requires that the end members 25 be fabricated of a material having suitable strength and stiffness to prevent springing under load which could cause separation or loss of fluid tight characteristics of the juncture.

The fuel tank 10 is attached to the vehicle by a plurality of breakaway mountings, generally indicated by the numeral 50. As shown, a number of the mountings 50 are located outwardly of end members 25; however, placement may be dictated by the available structure proximate the location in the vehicle. The mountings 50 shown are bolts 51 having their heads 52 secured by spot welding, or comparable means of attachment, to the end members 25. The breakaway feature may be accomplished by constructing the bolts 51 of a material which will fail at a predetermined stress short of the failure point of other components of the fuel tank 10, thus releasing one or more of the mountings 50 from the vehicle prior to rupture of the tank and the attendant fuel spillage. Alternatively, the bolts 51 may be notched or undercut to fail at a precalculated stress level. Other controlled failure structures which will achieve the desired purpose can be readily imagined by persons skilled in the art. It is also apparent that other types of attachment between the vehicle and the fuel tank 10, such as straps engaging body portion 11, may be employed in addition to or in lieu of the mountings 50.

Referring now to the modified form of attachment of FIG. 2, the securing device, generally indicated by the numeral 145, is adapted to engage an attachment configuration, indicated by the numeral 120, which may be formed identical to configuration 20 of FIG. 1. The securing device 145 has a ring clip 146 which differs from the inturned loop 46 primarily in the provision of a support leg 147 which gives substantially circumferential support for the attachment configuration 120 once the ring clip 46 is die crimped to the holding position depicted. The ring clip 146 is attached to the end plate 126 in any convenient manner such as the spot welds 148. It should be noted that a construction according to this embodiment allows the ring clip 146 to be fabricated of a heavy, stiff material while the end members 125 are of a lesser gage or thickness, thereby effecting substantial material savings.

The modified form of attachment between the body portion 211 and the end members 225 contemplated in FIG. 3 is based upon a different attachment configuration, generally indicated by the numeral 220. According to procedures well known in the tire building art, the attachment configuration 220 may be shaped somewhat as desired and in this case in such a manner as to form an enlarged triangle 221—in cross section. A compatible securing device 245 is employed in the form of a U-shaped retaining clip 246 which has a base member 247 attached to end plate 226 by spot welds 248 and extending legs 249 which are crimped together to enclose the enlarged triangle 221 of attachment configuration 220.

A somewhat different means of attachment between a body portion 311 and an end member 325 is disclosed in FIG. 4. An attachment configuration 320 comparable to those previously described is restrained by a securing device, generally indicated by the numeral 345. According to this form of the invention, a radially outward portion of end plate 326 is bent toward body portion 311 to form a flange 327 such that attachment configuration 320 reposes radially outwardly thereof. The flange 327 may have curved lip 328 projecting radially outwardly to prevent slippage of the attachment configuration 320 axially of the body portion 311. The attachment configuration 320 is secured to the flange 327 by a clamping band 329 which preferably may be adjustably drawn down according to numerous well known procedures to effect any desired sealing pressure. Since the area of attachment configuration 320 where a bead 321 is located is normally slightly enlarged, the clamping band 329 may be advantageously placed axially inwardly thereof on the body portion 311. The clamping band 329 could also take the form of one or more wires, a coil spring, or other comparable detachable fastener.

Figure 5:
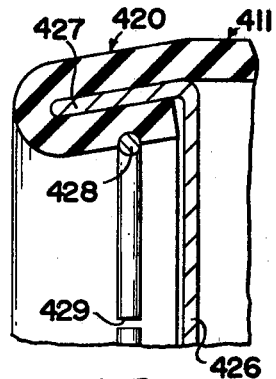
FIG. 5 is a partial section view of one end of the fuel tank of FIG. 1 showing another modified attachment wherein the elastomeric body portions wraps around the substantially rigid end members.

Another attachment between a body portion 411 and an end member 425 disclosed in FIG. 5 dispenses with the necessity for forming a bead structure. The extremity forming an attachment configuration 420 is therefore identical to the body portion 411. In this instance the end plate 426 has a radially outward portion bent away from body portion 411 to form an annular projection 427. The attachment configuration 420 is then wrapped around the projection 427 and preferably until its extremity is proximate to the end plate 426. An expansion ring 428 having a break or opening 429 is compressed and inserted within the annular projection 427 and, upon release, expands to force the attachment configuration 420 against annular projection 427 and effect the requisite stress resistant and fluid tight seal. Although not essential, it is advantageous to angle the extremities of projection 427 radially inwardly, as shown in FIG. 5, to restrain possible outward slippage of expansion ring 429.

Figure 6:
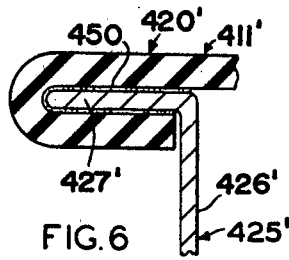
FIG. 6 is a partial section view showing a modified attachment similar to FIG. 5.

A variation of the attachment disclosed in FIG. 5 is depicted in FIG. 6 which takes advantage of recent advances in the adhesives technology. An attachment configuration 420' is wrapped around an annular projection 427' of end plate 426' which may be oriented substantially parallel the axis of the body portion 411', as shown, or be beveled as disclosed in FIG. 5. In this instance however, an adhesive 450 is applied between the attachment configuration 420' and the annular projection 427'. In case of an elastomeric body portion 411' and a metal end plate 426, an adhesive such as a carboxylic elastomer provides an extremely strong bond; however, the adhesive can be varied according to the materials employed and the sheering stress to be encountered, as will be apparent to persons skilled in the art. It is also evident that the attachment disclosed in FIG. 5 could be supplemented by adhesive bonding.

Figure 7:
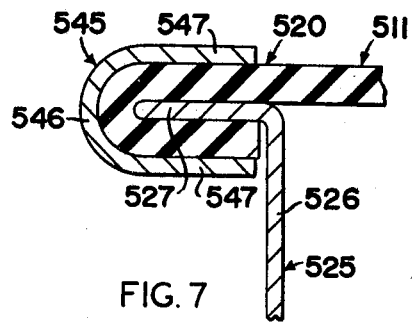
FIG. 7 is a partial section view of the device of FIG. 1 showing still another form of attachment employing an end member similar to FIG. 6 and a retaining clip.

The structure shown in FIG. 7 is similar to FIG. 6, except that a mechanical retention and sealing device is employed. The body portion 511 has its peripheral attachment configuration 520 wrapped around an annular projection 527 of end plate 526 which may be oriented substantially parallel the axis of body portion 511. The attachment configuration is held firmly in place by a retaining clip, generally indicated by the numeral 545, which may be substantially U-shaped. As shown, the retaining clip 545 has a base 546 and extending legs 547 which generally conform to the wrapped attachment configuration 520 and may be crimped to effect the requisite seal. If desired, the sealing and retaining characteristics could be supplemented by the use of an adhesive as disclosed hereinabove in conjunction with FIG. 6.

Figure 8:
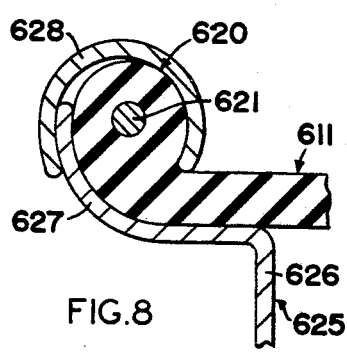
FIG. 8 is a partial section view similar to FIG. 1 showing a modified end member and retaining clamp.

The attachment disclosed in FIG. 8 is similar to that of FIG. 2 with a two-piece securing device. An attachment configuration 620 of a body portion 611 that preferably has a wire bead 621 engages an arcuate flange 627 of an end plate 626 which is curved axially outwardly of and radially away from the axis of the body portion 611. Preferably, the arcuate flange 627 will substantially conform to the portion of attachment configuration 620 which it engages. A retaining clamp 628 which may be generally semi-circular in cross section encases the attachment configuration 620 and overlaps the arcuate flange 627. Once the retaining clamp 628 is crimped or clamped in place, the attachment configuration 620 is sealed on substantially all sides in fluid tight relation with the end member 625.

It can be seen that the disclosed apparatus accomplishes the objects set forth above. Since various modifications in details, materials, and arrangements and combination of parts are within the spirit of the invention herein disclosed and described, the scope of the invention should be limited solely by the scope of the attached claims.

What is claimed is:

1. A crash resistant fuel tank for vehicles comprising, an elastomeric body portion, substantially rigid end members spaced by said elastomeric body portion, means associated with said end members providing ingress, egress, and quantitative measurement of fuel, connecting means joining said body portion to said end members to form shock resistant, fluid-tight junctures, and breakaway mounting means for connecting said fuel tank and the vehicle for detachment prior to failure of said fuel tank.

2. Apparatus according to claim 1, wherein said connecting means comprises attachment means on said body portion and securing means on said end members.

3. Apparatus according to claim 2, wherein said attachment means comprises enlarged sections proximate the extremities of said body portion.

4. Apparatus according to claim 3, wherein said body portion has at least one ply of material encasing a wire bead to form said enlarged sections.

5. Apparatus according to claim 4, wherein said securing means has arcuate flanges conforming to said enlarged sections and a retaining clamp partially encasing both the arcuate flanges and said enlarged sections.

6. Apparatus according to claim 4, wherein said securing means has a substantially axial projection and a clamping band drawing said attachment means against said axial projection in sealing relation.

7. Apparatus according to claim 2, wherein said securing means comprises clamping elements at least partially encasing said connecting means.

8. Apparatus according to claim 7, wherein said clamping elements constitute inturned loops crimpingly engaging said securing means.

9. Apparatus according to claim 7, wherein said end members have substantially flat plates and said clamping elements constitute U-shaped retaining clips welded to said flat plates.

10. Apparatus according to claim 2, wherein said securing means has an axially outward projection and said attachment means constitutes the extremities of said body portion, said attachment means being wrapped around and secured to said outward projection.

11. Apparatus according to claim 10, wherein said attachment means is secured to said outward projection by an adhesive.

12. Apparatus according to claim 10, wherein said outward projection is angled radially inwardly and said attachment means is secured against said outward projection by an expansion ring.

13. Apparatus according to claim 10, wherein said attachment means is secured to said outward projection by a retaining clip.

14. Apparatus according to claim 1, wherein said elastomeric body portion comprises at least two inner strength plies, a fuel resistant innerliner, and a weather resistant outerliner.

15. Apparatus according to claim 1, wherein said breakaway mounting means comprises a plurality of bolts designed to fail at a predetermined stress.

References Cited

UNITED STATES PATENTS

| | | | |
|---|---|---|---|
| 2,354,438 | 7/1944 | Craig | 280—5 |
| 2,376,336 | 5/1945 | Brown | 280—5 |
| 2,427,352 | 9/1947 | De Sanders | 280—5 |
| 1,691,509 | 11/1928 | Ashworth. | |
| 2,476,446 | 7/1949 | Lindell | 220—67 X |
| 2,517,860 | 7/1950 | Forgy | 244—1 |
| 2,793,669 | 5/1957 | Clarke | 150—0.5 |
| 2,844,178 | 7/1958 | Coleman | 150—0.5 |
| 2,846,231 | 8/1958 | Fritz. | |
| 2,854,048 | 9/1958 | Cunningham | 150—0.5 |
| 3,043,542 | 7/1962 | Neuschotz | 244—135 |
| 3,014,730 | 12/1961 | Cole. | |
| 3,129,014 | 4/1964 | Hutchison et al. | |
| 3,155,133 | 11/1964 | Clergerie | 150—0.5 |

FOREIGN PATENTS 621,745  6/1961  Canada.

LEO FRIAGLIA, Primary Examiner

U.S. Cl. X.R.

150—0.5; 220—67